(12) United States Patent
Brockbank

(10) Patent No.: US 6,573,911 B2
(45) Date of Patent: *Jun. 3, 2003

(54) COMMUNICATING BETWEEN STATIONS

(75) Inventor: Robert G Brockbank, Suffolk (GB)

(73) Assignee: British Telecommunications Public Limited Company, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/101,962

(22) PCT Filed: Feb. 12, 1998

(86) PCT No.: PCT/GB98/00310

§ 371 (c)(1),
(2), (4) Date: Jul. 21, 1998

(87) PCT Pub. No.: WO98/36456

PCT Pub. Date: Aug. 20, 1998

(65) Prior Publication Data

US 2002/0107906 A1 Aug. 8, 2002

(30) Foreign Application Priority Data

Feb. 12, 1998 (EP) .............................. 97300888

(51) Int. Cl.[7] .............................................. G06F 13/00
(52) U.S. Cl. ...................................... 345/753; 709/203
(58) Field of Search ................................ 345/326, 329, 345/330, 331, 332, 335, 336, 346, 962, 971, 700, 705, 733, 744, 751, 753, 759, 764, 804; 709/202, 203, 204, 205, 300

(56) References Cited

U.S. PATENT DOCUMENTS

| 5,008,853 | A | * | 4/1991 | Bly et al. | 345/751 |
|---|---|---|---|---|---|
| 5,353,398 | A | * | 10/1994 | Kitahara et al. | 345/759 |
| 5,392,400 | A | * | 2/1995 | Berkowitz et al. | 709/203 |
| 5,563,805 | A | * | 10/1996 | Arbuckle et al. | 709/204 |
| 5,835,713 | A | * | 11/1998 | Fitzpatrick et al. | 709/204 |
| 5,862,330 | A | * | 1/1999 | Anupam et al. | 709/204 |
| 5,884,032 | A | * | 3/1999 | Bateman et al. | 709/204 |
| 5,956,482 | A | * | 9/1999 | Agraharam et al. | 709/204 |
| 5,958,014 | A | * | 9/1999 | Cave | 709/229 |
| 6,070,185 | A | * | 5/2000 | Anupam et al. | 709/204 |

FOREIGN PATENT DOCUMENTS

| EP | 0319232 | | 6/1989 |
|---|---|---|---|
| EP | 0622929 | A2 | 11/1994 |
| EP | 0622930 | A2 | 11/1994 |

OTHER PUBLICATIONS

Frivold et al, "Extending WWW for Synchronous Collaboration", Computer Networks and ISDN Systems, vol. 28, Nol. 1½ Dec. 1994, pp. 69–75, XP002037466.

Jacobs et al, "Filling HTML Forms Simultaneously" CoWeb —Architecture and Functionality, Computer Networks and ISDN Sysems, vol. 28, Nol. 11, May 1996, pp. 1385–1395, XP004018236.

* cited by examiner

Primary Examiner—Crescelle N. dela Torre
(74) Attorney, Agent, or Firm—Nixon & Vanderhye PC

(57) ABSTRACT

A customer station and an agent station communicate with a call center server. In response to a customer server issuing a resource location to the server, an HTML page is returned containing a Java applet. The server is also connected to a plurality of agents, possibly at a service center. The customer station and its associated agent station receive substantially similar pages. In response to a modification being made at either station, the information is relayed to the server resulting in modified pages being displayed at both the customer station and the agent station. In this way, it is possible for an agent to assist a customer completing application forms. A voice channel may be provided in parallel with the on-line communication.

12 Claims, 11 Drawing Sheets

1201 — Handle Event (Event.target==choice box)

1202 — Handle Event (Event.target==button)

Figure 12

COMMUNICATING BETWEEN STATIONS

BACKGROUND OF THE INVENTION

1. Field of the Invention

The present invention relates to communicating between a first station and a second station, in which a communication is initiated from one of said stations.

2. Related Art

Many environments are known for facilitating communication between stations. Increasingly, business activities are being performed using telecommunication systems in which customers are placed in contact with agents. Presently, this is usually achieved using conventional voice circuits, via the public switched telephone network although proposals have been made for allowing video connections, employing the integrated services digital network.

Increasingly, use is also being made of the Internet and, in particular, the World Wide Web, making use of hypertext transport protocol for conveying Hypertext Mark-up Language (HTML) pages of information between stations. However, presently, the nature of the World Wide Web is such that it is arranged to convey discrete pages and, as such, does not facilitate the presentation of an integrated service.

SUMMARY OF THE INVENTION

The present invention relates to a method of communicating between a first station and a second station, comprising steps of establishing communication from said first station to a serving means; establishing communication from said serving means to said second station; displaying similar prompting information at both said first station and at said second station; receiving manually generated data in response to said prompting information at either said first station or said second station; and displaying said generated information at both said first station and at said second station.

In a preferred embodiment, a user at a first station initiates communication to make contact with said serving means. Agents may also identify their availability to receive communications from users by contacting said serving means.

Preferably, the stations execute browsing instructions, transmit resource locations and receive encoded pages of information from the serving means. The encoded pages may include executable routines to present modified pages at the stations.

In a preferred embodiment, manually generated data is encoded as a message and transmitted to the serving means and the serving means may supply encoded pages to associated stations in response to receiving these messages.

According to a second aspect of the present invention, there is provided communication apparatus comprising a first station, a second station and a serving means, including means for establishing communication from said first station to said serving means; means for establishing communication from said serving means to said second station, wherein said serving means includes means for generating encoded information for application to said stations; wherein said stations include means for displaying pages of information received from said serving means and for receiving manually generated data in response to displayed prompts, and said serving means includes means for receiving information from said stations and for issuing substantially similar information to said first station and to said second station.

Preferably, said apparatus includes means for initiating a telephone call between said stations in response to said station being associated through said serving means.

BRIEF DESCRIPTION OF THE DRAWINGS

FIGS. 10, 11 and 12 show examples of pages displayed at the stations.

DETAILED DESCRIPTION OF THE PREFERRED EMBODIMENTS

The invention will now be described by way of example only with reference to the previously identified drawings.

Figure 1:
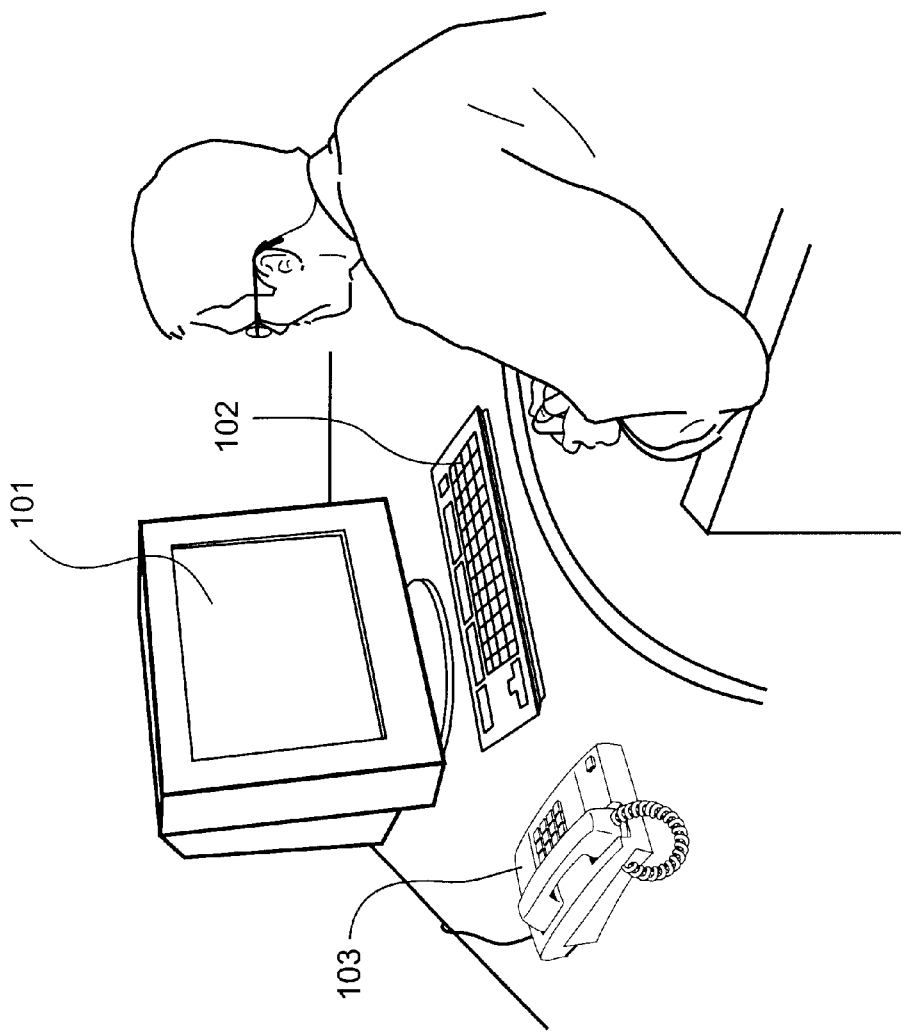
FIG. 1 illustrates a customer operating a personal computer executing browser software and connected to a server via a public switched telephone network.

A customer terminal is shown in FIG. 1 in which a visual display unit 101 and a manually operable keyboard 102 are connected to a processing platform, such as an IBM PC or similar. The PC communicates over the World Wide Web via a modem connected to a PSTN line. A similar PSTN line also provides voice communication via a telephone 103.

The terminal shown in FIG. 1 executes browsing software such that an operator may enter or select a Universal Resource Location (URL) which is then transmitted, in accordance with Internet protocol, via the modem. The URL is identified by the Internet and directed to the server specified by the URL. In response to receiving this URL, the server issues an HTML Web page which is returned to the requesting browser. Thus, in response to entering a URL at their terminal, the customer receives an HTML page for display on monitor 101. The page may include hyperlinks to other HTML pages and the page may also include small executable programs, referred to as "applets" possibly defined in accordance with the Java programming language.

Call centers are known in which a plurality of agents are configured to receive calls from calling customers. The agents often have access to database facilities and similar technology which allows information to be received and entered, while customer files may be accessed to present a very personal "face" to calling customers. A call center may include any number of agents at a single location. Additionally, several locations may be coordinated centrally and outworkers may also log onto the system.

A telephone answering system with a plurality of agent stations is described in the applicant's co-pending international patent application, published as WO 96/22649. A system is described in which forecasted levels are translated into active agent station requirements with reference to previously stored data. Thus, over a working day, the number of stations activated will vary and, throughout the day, irrespective of the level of calls being made, calling customers should not have to wait more than a specified time for a call to be answered, thereby maintaining good customer relations.

Figure 2:
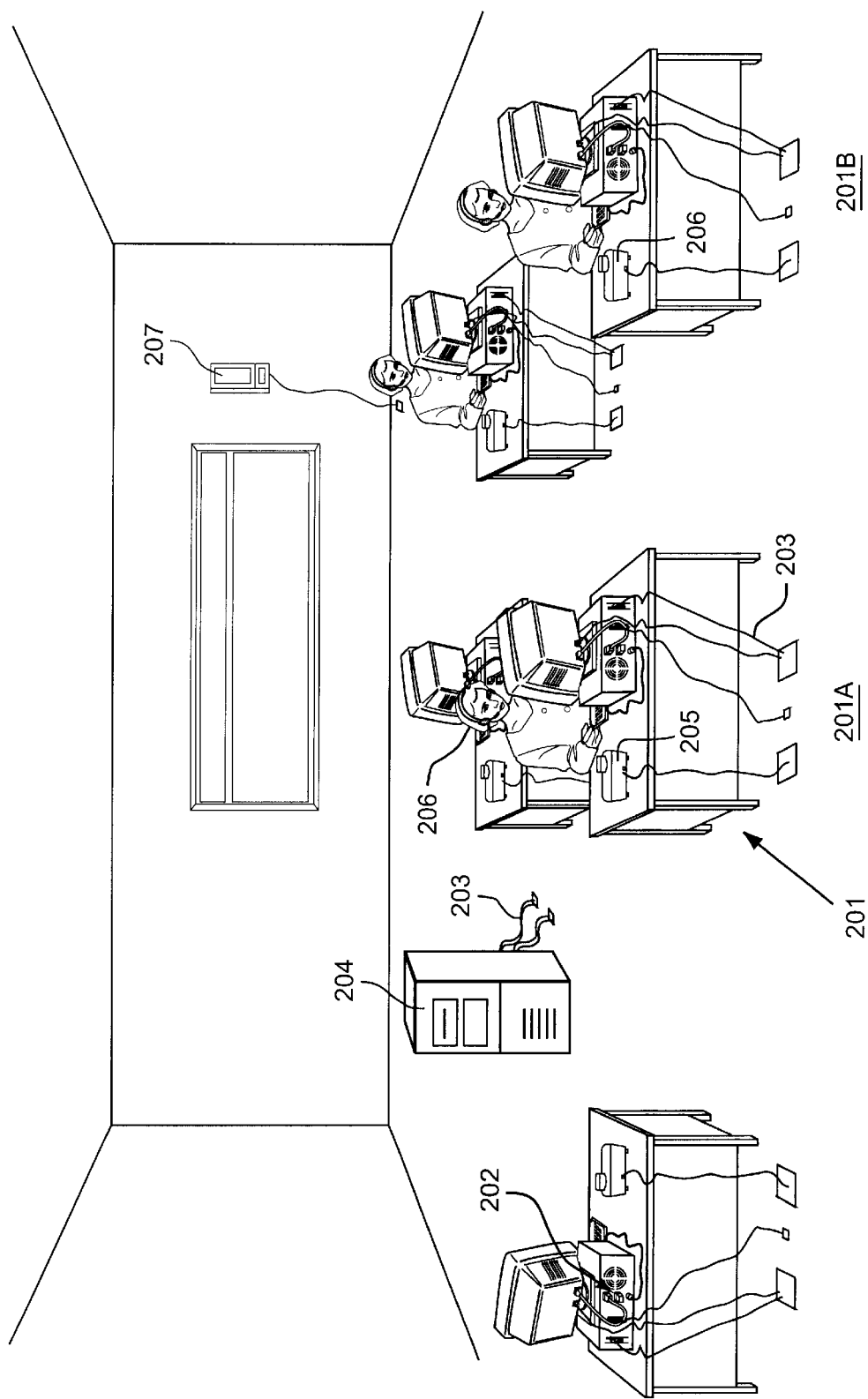
FIG. 2 illustrates a call center having a plurality of agents each with browsing terminals connected to a computer configured to operate as a server for the generation and supply of HTML pages.

A call center is shown in FIG. 2 in which a plurality of agent stations 201 are arranged to receive calls. Each agent station includes a personal computer 202 running browser software and connected by an Ethernet cable 203 to a computer workstation 204. In addition, the stations include telephone terminals 205 and terminal headsets 206 to provide voice communication via a private branch exchange 207. Thus, a customer may communicate with the server 204 via a customer terminal of the type shown in FIG. 1, and via the World Wide Web, while agents may communicate with server 204 via agent stations 201 and the local network established by the Ethernet link 203. In this way, it is possible for a customer to obtain information from agents and, similarly, for the agents to receive information from the customer.

A communication may be established from either end but usually, in accordance with the preferred embodiment, a customer would identify a particular service while browsing HTML pages. Upon selecting a particular service, communication is established from a customers terminal to the server 204. Similarly, agents will have established communication to the server 204, identifying themselves as being in an active state and the server 204 will communicate with a selected activated agent station. Communication between a customer and an agent is then facilitated by the displaying of a similar page of prompting information at both the customer station and at the agent station. In response to these prompts, both the agent and the customer may manually enter data into the displayed form which is then in turn transmitted to the server 204. The server then issues updated pages to both the customer and to the agent such that the information generated by one of the parties is displayed at both of the stations. Thus, communication between the parties is facilitated by each station having a communication channel to the server, without the need for a direct communication path between the stations. In this way, it is possible for both the customer and the agent to execute general purpose browsing instructions with the overall service being coordinated by the server 204.

Figure 3:
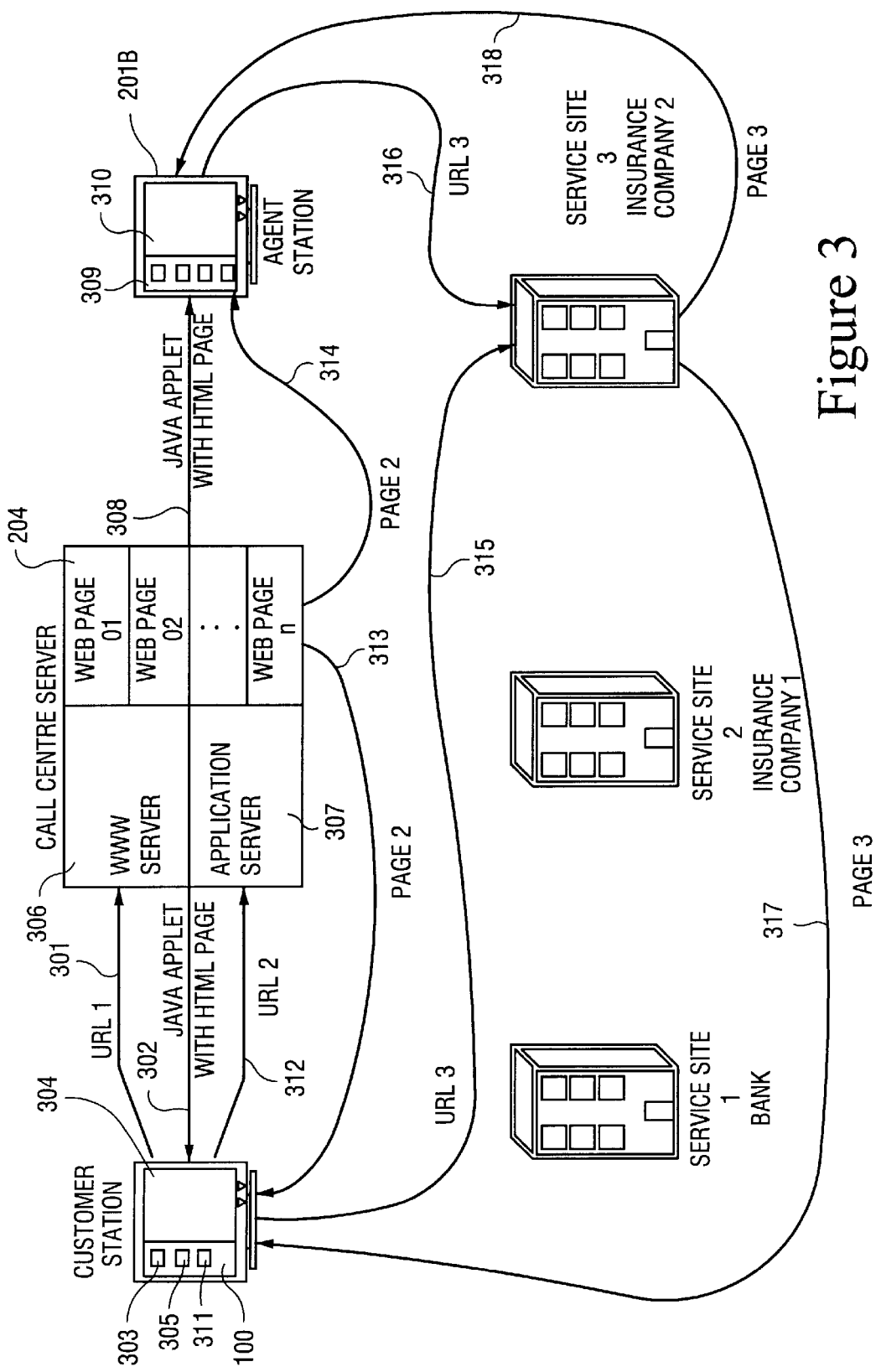
FIG. 3 illustrates the interrelationship between the browser shown in FIG. 1 and the call center illustrated in FIG. 2, embodying the present invention.

Overall operation of the system is illustrated schematically in FIG. 3. Commercial Web pages have been known for some time in which a customer may access pages of information generated by commercial organisations which in turn may have links to additional pages offered by said organisation. The present invention provides an environment in which services of this type may be coordinated such that, from a first central starting point, sometimes referred to as a "home page", it is possible to access services provided by many different commercial organisations. Thus, unlike a conventional home page which refers to a single organisation, a higher level home page may be presented, within a Java environment, allowing access to a plurality of organisations in dependence upon customer requirements. Furthermore, these organisations may be grouped into service types, so that, from said central location, a customer may identify a particular type of service, identify particular requirements for said services and then be provided with information from a number of potential suppliers who may be in a position to provide the goods or services required by the customer.

Referring to FIG. 2, it will be assumed that the agent seated at station 201A is familiar with the provision of utilities, such as electricity, water and gas etc. However, the agent seated at location 201B is familiar with financial products, such as mortgages, life insurance and investments etc. The physical location of these agents is not critical, given that the agent will log-on to the system and identify themselves; the service is aware of agent specialities. Thus, the agent presently at location 201A could log-on to the system at location 201B and the system would then be aware that enquiries relating to utilities should be directed to station 201B.

Station 201B is presently involved with financial services and arrangements may have been made with a number of service providers, such as banks, building societies, insurance companies and financial institutions. These are identified schematically in FIG. 3 as Service Site 1 which contains information generated by a bank, Service Site 2 which includes information generated by a first insurance company and Service Site 3 which includes information generated by a third insurance company.

A calling customer, such as the customer shown in FIG. 1, identifies a URL which relates to the service as a whole. The URL is entered by the customer at the customer station 100 resulting in the URL being transmitted to the call center server 204.

This transaction is shown schematically by arrow 301. In response to receiving URL 1, the call center server 204 returns an HTML page to the customer station 100 with a Java applet embedded therein. The customer station 100 is now perceived as a virtual machine within the Java environment and, as such, is placed in a position to execute the Java applet and to respond to instructions applicable to said applet. The transmission of this HTML page from the server to the customer station is illustrated schematically by arrow 302.

The transmission of the first HTML page from the server, illustrated by arrow 302, actually consists of a first page containing two URL's configured to request two further pages to be supplied to the customer station. These pages are stored at the server, as illustrated as web page 01, Web page 02 to web page N. In this way, the customer station displays a first frame 303 positioned alongside a second frame 304. The first frame 303 displays soft buttons 305, which may be selected by positioning a cursor over the button in response to movements of a mouse and clicking an appropriate mouse button. Thus, these buttons relate to operations applicable to the call center server 204, whereas HTML pages originating from anywhere within the World Wide Web may be displayed within the second frame 304.

The call center server 204 executes two serving applications within the preferred embodiment. The first server application 306 provides the functionality required by a general purpose World Wide Web server, essentially allowing for the provision of HTML pages in response to URL's. In addition to this, an application server 307 is responsible for overseeing the functionality of the specific call server operations. In particular, it facilitates communications between customer stations, such as station 100 and agent stations, such as station 201B.

The provision of HTML page 302 is controlled by application server 307, effectively establishing the split frame environment at customer station 100. Thereafter, application server 307 supplies a similar HTML page to agent station 201B, illustrated schematically by arrow 308. Thus, pages 308, with their associated Java applets, creates a substantially similar environment at the agent station 201, such that a first frame 309 and a second frame 310 are displayed, substantially similar to the first and second frames displayed at the customer station. However, given that an agent may require additional functionality to that provider to a customer, as illustrated in FIG. 3, the first frame of the agent station is provided with more buttons than those displayed to the customer, although the entire collection of buttons provided to the customer are also displayed at the agent's station. The first transmitted page contains the Java applet and subsequent pages may be "popped" from the applet or received from the server in response to a URL.

In this example, it will be assumed that the three buttons displayed to the customer relate to the services dealt with by the agents at agent station 201B. This may consist of general banking services, household insurance and motor insurance. In this example, the customer is interested in motor insurance and information relating to motor insurance is derived from service site 3. A customer at customer station 100 selects an appropriate button, say button 311, indicating an interest in motor insurance. This selection is trapped by the Java applet being executed at the customer's station. The customer station now generates a message which is supplied to the server identifying that a particular button has been pressed. The server interprets this message and in response to this message, identifies an appropriate URL. A message is then sent back to the applet which contains the string of the particular URL required. The applet interprets the returned message and passes the decoded URL to the station's browser resulting in an appropriate URL, identified as URL2 at arrow 312, being supplied to the application server 307. This example shows the transmission of HTML pages in response to URL's. As previously stated, forms are also presented to customers and to agents from the Java applet itself and this particular detail is detailed subsequently.

The URL received at application server 307 identifies a web page stored at the server which is in turn returned to the selecting customer. Thus, from the customer's perspective, a second HTML page is received, which may be identified as page 2, shown schematically by arrow 313. When this page is received, it is displayed in the second frame 304 at the customer station and may, thereafter, be processed by a user in a way substantially similar to operations provided by conventional web pages. In addition, the same page (page 2) is transmitted to associated agent station 201B, shown schematically by arrow 314. Thus, in a conventional way, the customer may be invited to add information to the HTML page so that said page, with the information therein, may be returned to the application server. However, in addition, an agent also receives the same page and as such the agent is placed in a position to assist the customer in the process of completing the form. In this way, the customer is less likely to become frustrated with the process of completing the form and is much more likely to complete the transaction. Similarly, from the agent's point of view and ultimately from the perspective of the company providing the services, the probability of obtaining a sale is greatly enhanced.

In a preferred embodiment, the customer is also contacted by telephone in parallel with communication being facilitated over the World Wide Web. When a calling customer is associated with an agent, the customer is invited to identify his telephone number. This information is supplied to the application server which in turn instructs PBX 207 to initiate a call back to the calling customer. Similarly, the PBX also initiates an internal call to the appropriate agent station, such that a conventional voice connection is then established from the call center back to the customer. In this way, the calling customer is not charged for the telephone call.

In an alternative embodiment, a video link may be established between the call center and the calling customer and video booths may be provided at public locations allowing any customers to make use of the server without requiring their own equipment.

After the voice connection has been established, the agents may invite the associated customer to enter further information into a displayed page. The Java applets executed by the customer stations and by the agent stations are configured to handle events as they occur, such that the new data is displayed locally in a substantially conventional way. In addition, this event information is also packaged into a message which is then transmitted by the generating station to the server. The information contained in the message is stored by the server and also relayed to the associated station. The information may be relayed to the associated station without being modified. However, appropriate modifications may be made, such as to the color of text, so as to indicate, at each station, the difference between text originating locally and text originating from the remote associated station.

The message transmitted from the server is interpreted by the associated station and used to modify the page displayed at that station. Thus, the applet being executed at the associated (remote) station responds to the received message in a way substantially similar to that in which it would respond to locally generated information. Thus, in response to the message, the displayed page at the associated (remote) station is modified in a way substantially similar to the changes made at the originating station. This process is also bi-directional such that the agent may make a modification at the agent station, a modification will be shown in the form at the agent station, a message will be transmitted to the server and again a similar message will then be relayed from the server to the remote station, in this case the customer station. Such messages may also include URL's, resulting in pages of information being supplied to both the requesting station and the associated station remote station.

After completing a first page, it may then be appropriate to complete further pages obtained from particular suppliers. Thus, an HTML page supplied via arrow 313 and 314 may include hyperlinks to HTML pages residing elsewhere within the World Wide Web. As previously stated, in this example, the calling customer is interested in motor insurance and services of this type are obtained from Service Site 3. Thus, in response to selecting particular hyperlink, a further URL, shown as URL 3, is supplied to Service Site 3 as illustrated by arrow 315. Similarly, arrow 316 shows that URL 3 may also be generated by the agent station. Thus, the customer station and the agent station may both select a new HTML page via the hyperlink.

In response to URL 3 being generated by either a customer station or an agent station, the selected page, shown as page 3, is returned to the customer station, via arrow 317 and is also returned to the agents station shown schematically by arrow 318.

If agent station 201 selects page 3, this will be returned to the agent station directly via the World Wide Web, as illustrated by arrow 318. Similarly, if the customer station directly requests this page, it will be returned in a conventional way via the World Wide Web as illustrated by arrow 317. However, Service Site 3 is not aware of the particular service being implemented by the call center. It provides a conventional web server and, in response to a single URL will return the requested HTML page.

Figure 4:
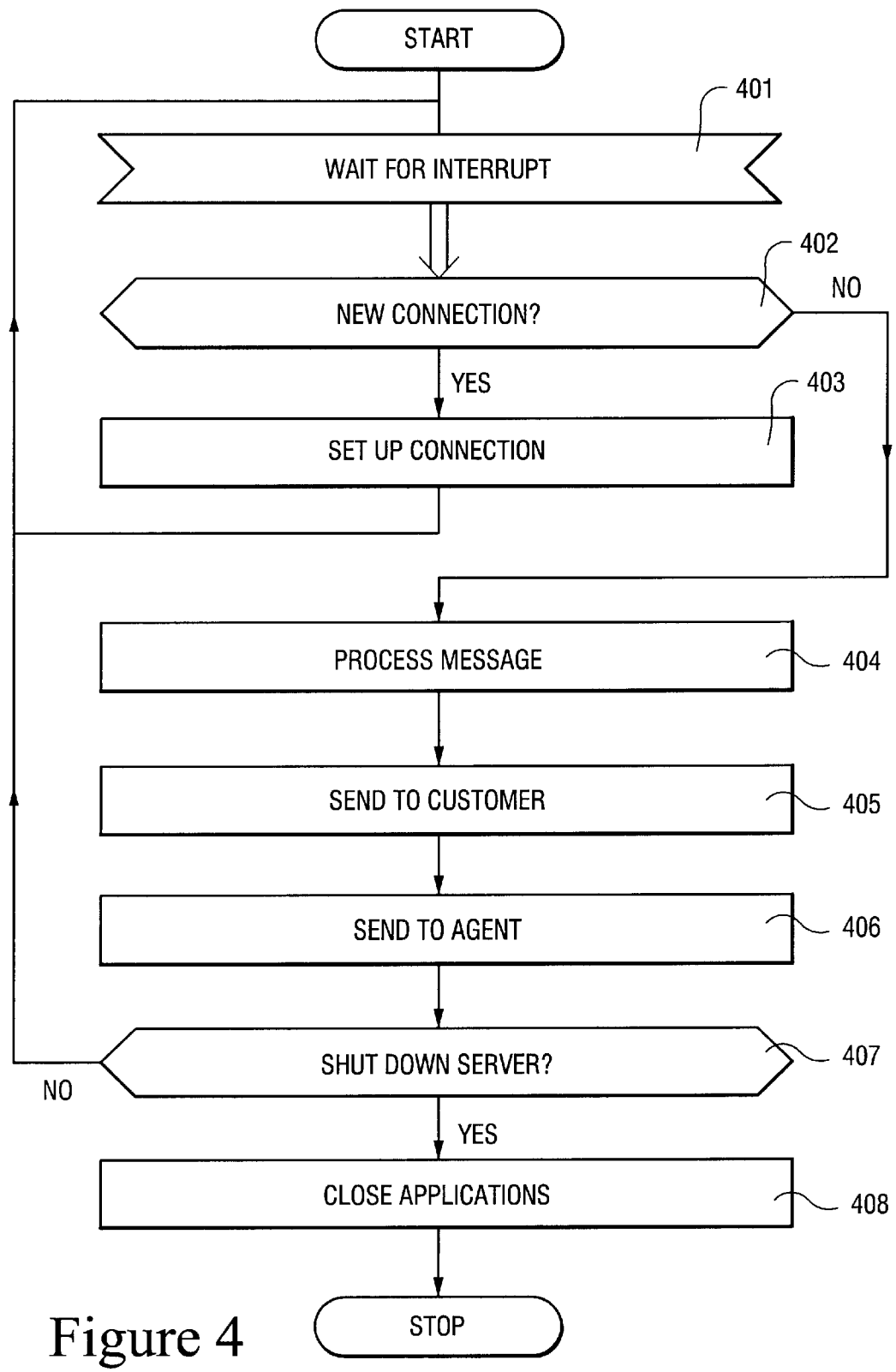
FIG. 4 illustrates operations performed by the call center server shown in FIG. 2, including procedures for setting up a new connection and procedures for processing existing connections.

If the calling customer requests page 3, which is returned by arrow 317, the reception of such a page is identified by the applet being executed by the customer station. This information is then supplied to the agent station, via the application server, resulting in the agent station making a similar request. Thus, the customer station, the agent station and the Service Site are all performing very conventional tasks within the World Wide Web environment. However, the overall functionality of the service is greatly enhanced by the provision of the application server which is echoing operations made by one station (the customer station or the agent station) to the other station (the agent station or the customer station, respectively). The nature of the communication provided between customer stations and agent stations is facilitated by the application server 307. Operations performed by the application server 307 are shown in FIG. 4.

The procedures of the application server 307 are event driven and as such the application will be placed in a waiting mode until it receives an interrupt, or similar, forcing it into a more active mode of operation. Thus, at step 401 the application server is waiting for an interrupt and on detecting an interrupt condition or on detecting the reception of data from a customer station or from an agent station, control is directed to step 402.

At step 402 a question is asked as to whether the information received at the server relates to a new connection or to an existing connection. If the information is a new connection, the question asked at step 402 is answered in the affirmative and a new connection is set up at step 403, whereafter control is returned to step 401. Alternatively, if the information relates to an existing connection, control is directed to step 404, allowing the received message to be processed. This in turn results in a new HTML page being generated which is sent to the customer at step 405 and sent to the agent at step 406.

Under normal operating conditions, the application server will remain active, given that call centers often provide 24 hour service to calling customers. However, in the event of routine maintenance or similar, it would be necessary to shut down the application server, which, preferably, should be done in a controlled way. Thus, a question is asked at step 407 as to whether the server is to be shut down and when answered in the affirmative, applications are closed at step 408 and processing terminates. Alternatively, if the question asked at step 407 is answered in the negative, control is returned to step 401.

Figure 5:
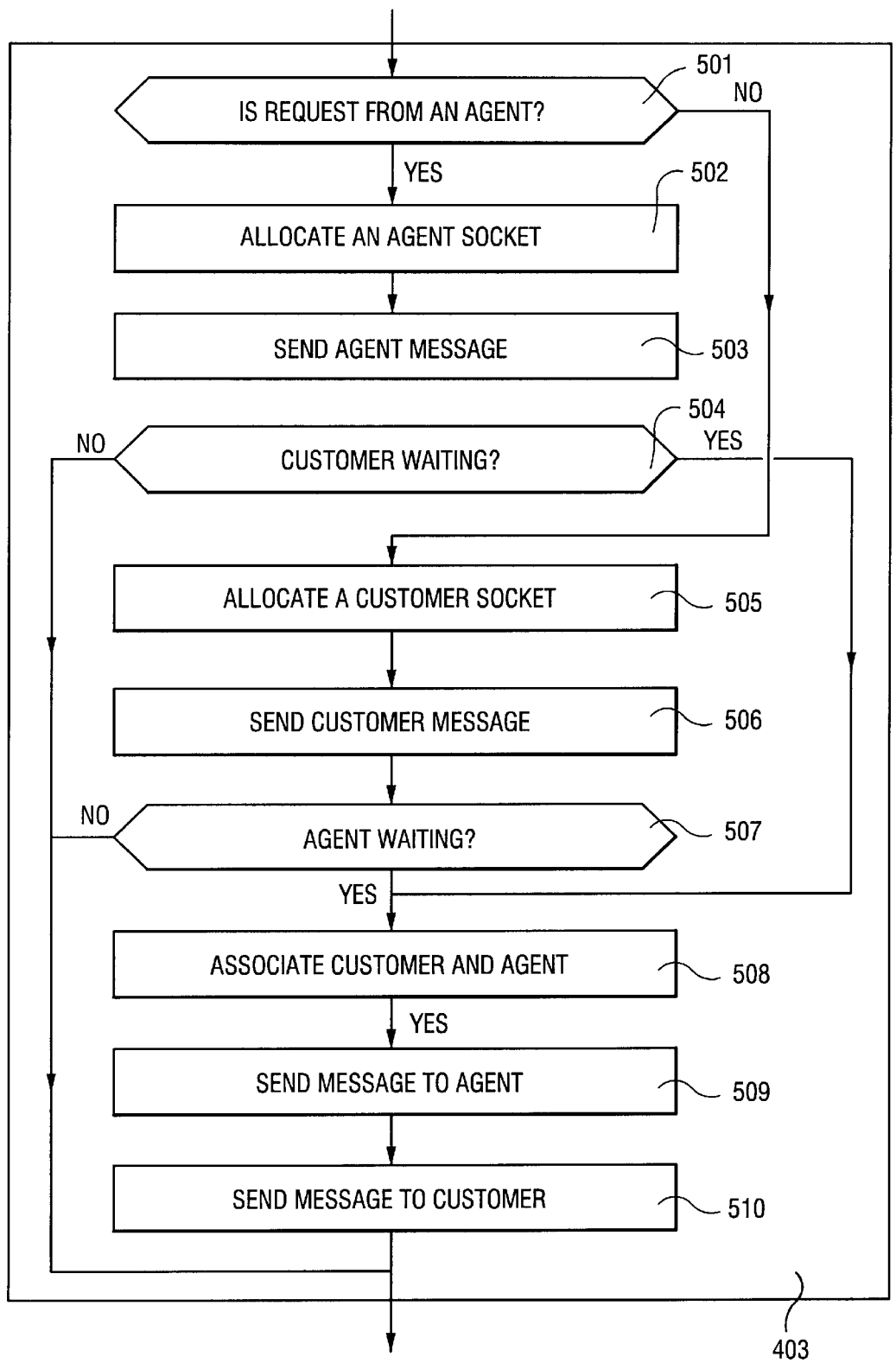
FIG. 5 details procedures for establishing new connections, identified in FIG. 4.

Procedures identified at step 403 for setting up a connection are detailed in FIG. 5.

At step 501 a question is asked as to whether the request is from an agent and if answered in the affirmative, an agent socket is allocated at step 502. An agent socket refers to a particular set of instructions executed upon the server such that further requests will identify a specific private address and messages attached to this address will be handled by the software socket established at step 502.

At step 503 a message is sent to the agent, including information identifying the agent socket defined at step 502 and at step 504 a question is asked as to whether a customer is waiting. Clearly, an important aspect of the embodiment is that customers need to be associated with agents therefore communication is only possible when customers are requesting assistance and when agents are available to provide this assistance. Thus, if the question asked at step 504 is answered in the negative, control is returned to step 401, awaiting the connection of a customer.

A similar procedure is performed if the question asked at step 501 is answered in the negative, to the effect that the request has been made by a calling customer. At step 505 a customer socket is allocated, substantially similar to the allocation of an agent socket at step 502 and at step 506 an appropriate message is sent to the customer applet, again identifying the private socket defined at step 505. Thereafter, a question is asked at step 507 as to whether an agent is waiting and if answered in the negative control is again returned to step 401.

If the question asked at step 504 is answered in the affirmative or if the question asked at step 507 is answered in the affirmative, control is directed to step 508, at which a customer and an agent are associated together as a communicating pair. Thereafter, a message to this effect is transmitted to the agent at step 509 and a similar message is transmitted to the customer at step 510. Thus, after the completion of these steps, a customer and an agent have been placed in communication via the application server 307. In addition, the same customer and the same agent may also communicate via a voice telephone call which, in the preferred embodiment, is automatically initiated by the call center.

Figure 6:
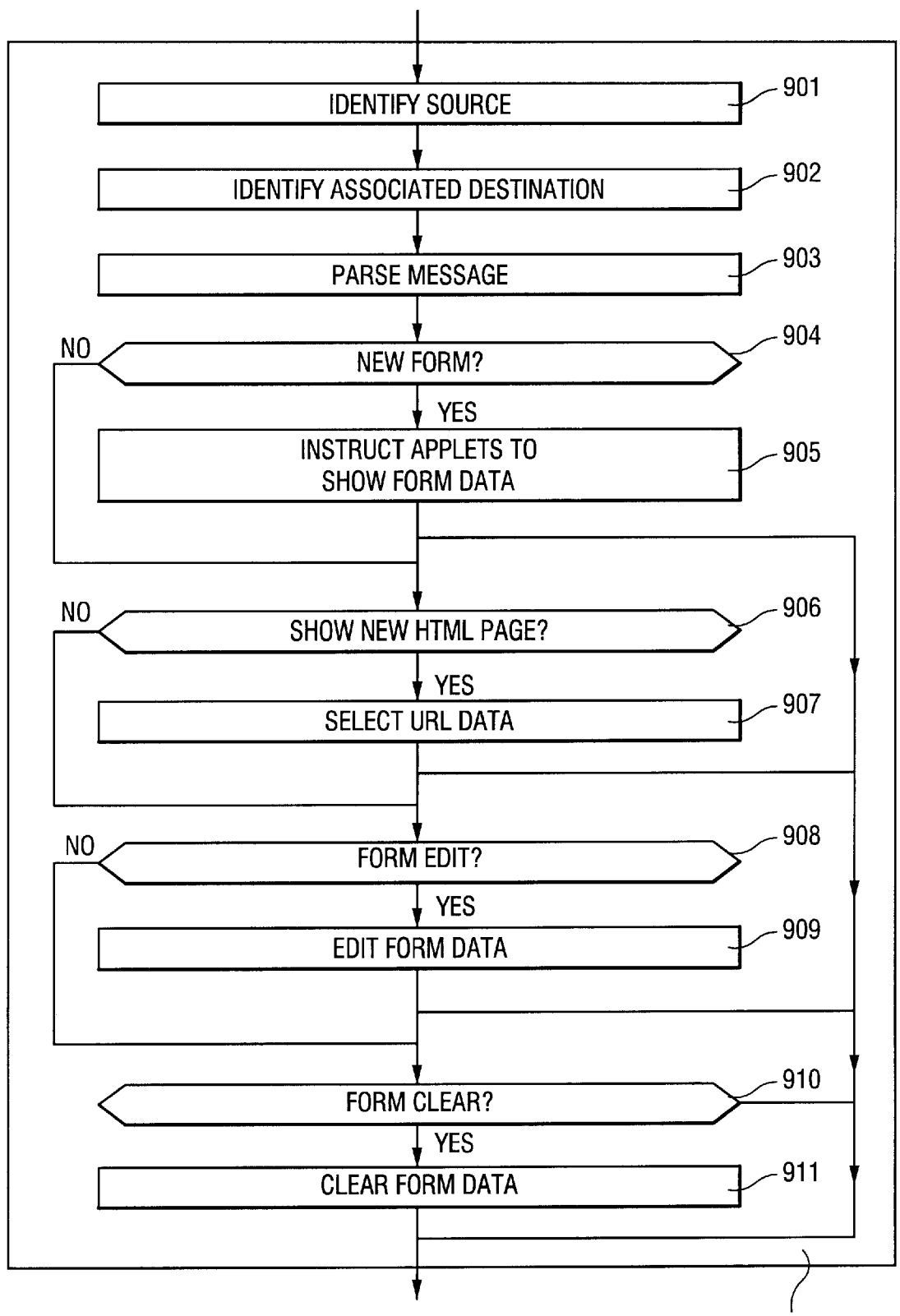
FIG. 6 details the procedures for processing existing connections identified in FIG. 4.

The procedures identified at step 404 for processing messages are detailed in FIG. 6. At step 901 the source of the message is identified and at step 902 the associated destination is identified from an association table. At step 903 the message is parsed to identify its content and to allow appropriate action to be taken.

At step 904 a question is asked as to whether a new form has been requested and if answered in the affirmative the applet is instructed to show the new form data at step 905.

If the question asked at 904 is answered in the negative, control is directed to step 906 where a question is asked as to whether a new HTML page is to be shown. If answered in the affirmative, the appropriate URL data is selected at step 907 but if answered in the negative control is directed to step 908.

At step 908 the question is asked as to whether a form editing procedure is required and if answered in the affirmative control is directed to step 909 where the appropriate form editing procedure is effected. Alternatively, if the question asked at step 908 is answered in the negative, control is directed to step 910 where a question is asked as to whether a clear form request has been made. If answered in the affirmative, control is directed to step 911 where form clear data is generated.

Steps 905, 907, 909 and 911 generate data, in the form of an encoded message, which is directed to the customer at step 405 and supplied to the agent at step 406. The message may be interpreted by the receiving applet to the effect that the browser is required to retrieve a particular page which would then subsequently be followed by the transmission of an HTML page. Alternatively, the message may instruct the applet to do something with one of the forms generated by the applet.

Figures 7, 9:
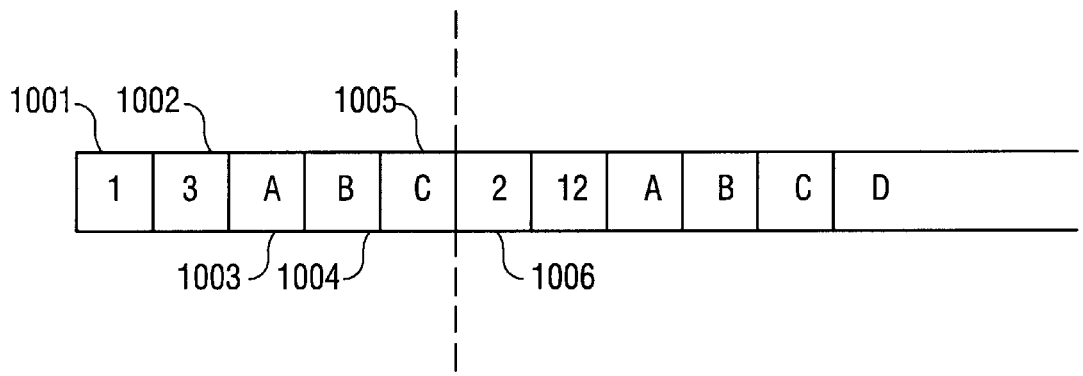
FIG. 7 shows the structure of messages transmitted from the stations to the server, in response to the detection of events.
FIG. 9 shows encoded instructions for identifying event type as shown in FIG. 11.

The nature of a message parsed at step 903 is illustrated in FIG. 7. The message includes a header identifying its destination along with information identifying its source. This information is stripped at step 901, after the source has been identified and at step 902 after the associated destination has been identified to produce a message of the type shown in FIG. 7 for the parsing step 903. The parsing step looks at the first byte 1001 of the message which identifies the particular message type. Thus, a convention has been adopted to the effect that an integer value of 1 relates to a new form, an integer value of 2 represents a new HTML page, an integer value of 3 represents a form edit and integer value of 4 represents a form clear.

Figure 8:
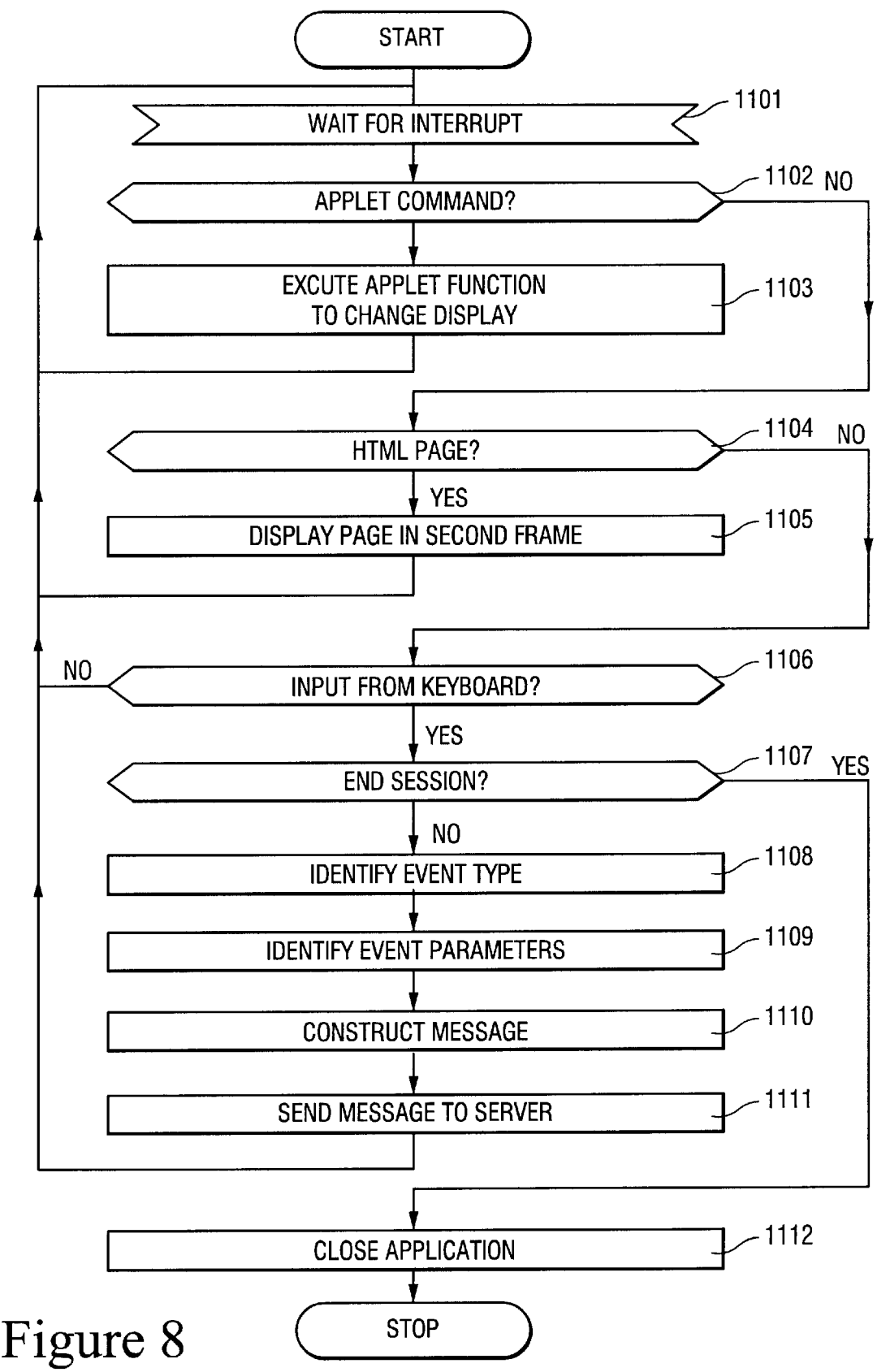
FIG. 8 details operations executed by stations, including procedures for identifying event type and procedures for constructing messages of the type shown in FIG. 7.

The next byte at location 1002 identifies the number of subsequent bytes that form part of the message. In the example shown, integer value 3 has been entered at byte 1002 showing that byte 1003, byte 1004 and byte 1005 constitute the full message length, with the next byte position 1006 relating to a further message. The byte at position 1001 is an integer value of 1 indicating that the message represents a new form. Thus, in response to this information, the question asked at step 904 will be answered in the affirmative. Byte position 1002 contains the integer value of 3 indicating 3 bytes forming part of the message. Thus, the values A, B, C at these three locations are directed to step 905 which in turn identifies the appropriate form to be displayed by the applet. This information is then bundled up into an appropriate message which will be understood by the receiving applet. The message is then packaged to include appropriate header information so that it may be transmitted to the stations using conventional Internet protocols. Procedures executable by the customer stations and the agent stations, defined by HTML applets, are shown in FIG. 8.

The procedure is event driven therefore at step 1101 a wait state is entered whereafter, in response to an interrupt, control is directed to step 1102. At step 1102 a question is asked as to whether the information has been received from the server and as such whether it consists of an applet command. This is an instruction to- the applet itself instructing it to display further information or make other modifications to the displayed HTML pages. If the question is answered in the affirmative, the appropriate applet function is executed at step 1103 in order to effect a change to the display and control is returned to step 1101.

If the question asked at step 1102 is answered in the negative, control is directed to step 1104 where a question is asked as to whether an HTML page request has been received from the server. If this question is answered in the affirmative, the local browser is then activated to receive the HTML page and control is directed to step 1105 resulting in the HTML page being displayed as a page of information in the second frame, whereafter control is returned to step 1101.

If the question asked at step 1104 is answered in the negative, control is directed to step 1106 where a question is asked as to whether the input has been received from a keyboard (mouse or similar data input device). If this question is answered in the negative, no further action may take place, having failed all three tests and control is returned to step 1101. However, if the question asked at step 1106 is answered in the affirmative a question is asked at step 1105 as to whether this represents an end of session. If answered in the affirmative, control is directed to step 1112, where the application is closed and the procedure terminated. However, if the question asked at step 1107 is answered in the negative control is directed to step 1108. Interrupts may also be generated by the resident browser. Such a situation may occur if the browser is required to move to a separate page, thus removing the left frame. For example the method known within Java as "stop" may be called so that the applet performs tidying up operations before it is closed. Under these circumstances, it would be arranged to close the socket connection and to remove forms. Thus, it should be understood that the "end session" event could come from the browser in addition to coming from the keyboard or mouse etc.

At step 1108 the event type is identified and at step 1109 relevant event parameters are identified. This information is constructed into a message, of the type illustrated in FIG. 10, and this message is supplied to the server at step 1111.

Java instructions of the type for performing event identification, as required by step 1108, are shown in FIG. 9. These consist of defining a handle upon an event which in turn returns parameters defining the event target followed by other parameters where appropriate. Thus, in response to instructions of this type, the particular type of event is returned, as required by step 1108 and parameters associated with the event are returned as required by step 1109. This allows each event, which may consist of a mouse movement, a selection, a button press or a text entry etc. being uniquely defined such that the information may be supplied to the server in the form of a message that the server understands. The information is then processed by the server application, with very little processing being provided by the applet itself, such that a modified HTML page may be returned back to the initiating station and also echoed to the other station.

Events in Java may be interpreted by a number of functions referred to as "methods" within the Java environment. The "handleEvent(EvenT e)" method is called by the Java virtual machine whenever any event occurs in a component. Without modification, this finds out what type of event has taken place and then calls various event handlers in order to attend to the event.

Thus, event handlers may be used to look for the form window being removed, the action of buttons being pressed, check box changes being made and key presses being entered within text fields. This allows the action to be uniquely defined from which an appropriate message may be generated.

A typical interaction will be described with reference to FIGS. 3, 10, 11 and 12. A customer initiates a session by browsing the World Wide Web and identifying a page of interest. Customer then issues URL1, as shown in FIG. 3, which results in the return of an HTML page as indicated by arrow 302, which is displayed on monitor 304.

Figure 10:
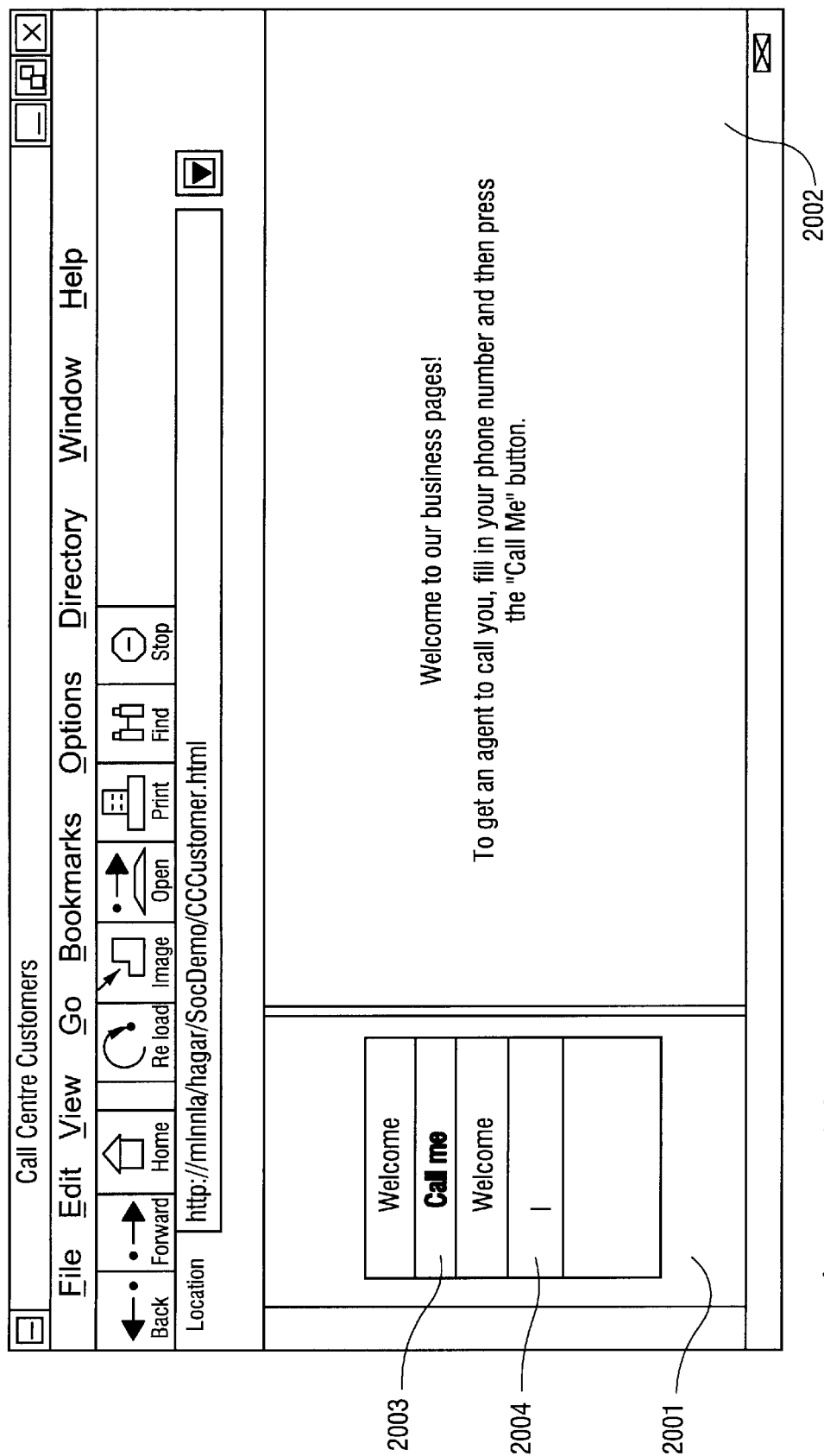

The displayed page may look something like the example shown in FIG. 10 and makes use of conventional web browsers, such as those supplied by Netscape. The HTML page is divided into a first frame 2001 to the left and a second frame 2002 to the right. The first frame displays soft buttons which may be selected, preferably by manual operation of a mouse in a process commonly referred to as "clicking". Right frame 2002 displays pages of information which may be popped from the Java applet or obtained from any server addressable by a universal resource location.

The display shown in FIG. 10 represents the first display provided within the service and is the starting point for all subsequent interactions. From the user's point of view, this image is displayed in response to issuing a single URL although the first return page includes an applet for the loading of subsequent URL's in order to present the complete image. Left frame 2001 includes a soft button 2003 with the legend "call me" and upon pressing this button a call is made is to the server indicating that the customer wishes to establish communication with an agent. The right frame displays a message to this effect and states that to get an agent the caller is invited to fill in their telephone number and then press the call me button. A telephone number is entered in text box 2004 and the Java applet may include a routine which makes a further prompt for the telephone number if the call me button 2003 is activated before a telephone number has been entered.

After entering a telephone number in text box 2004 and activating call me button 2003, a message containing an indication to the effect that the call me button has been activated and including the telephone number entered, is transmitted to the server 204. Routines previously described are executed at the server in order to associate the calling customer with an activated agent station. When an association of this type has been made, a message is returned back to the customer station, which is interpreted by the Java applet resulting in new forms being popped by said applet as shown in FIG. 11.

Figure 11:
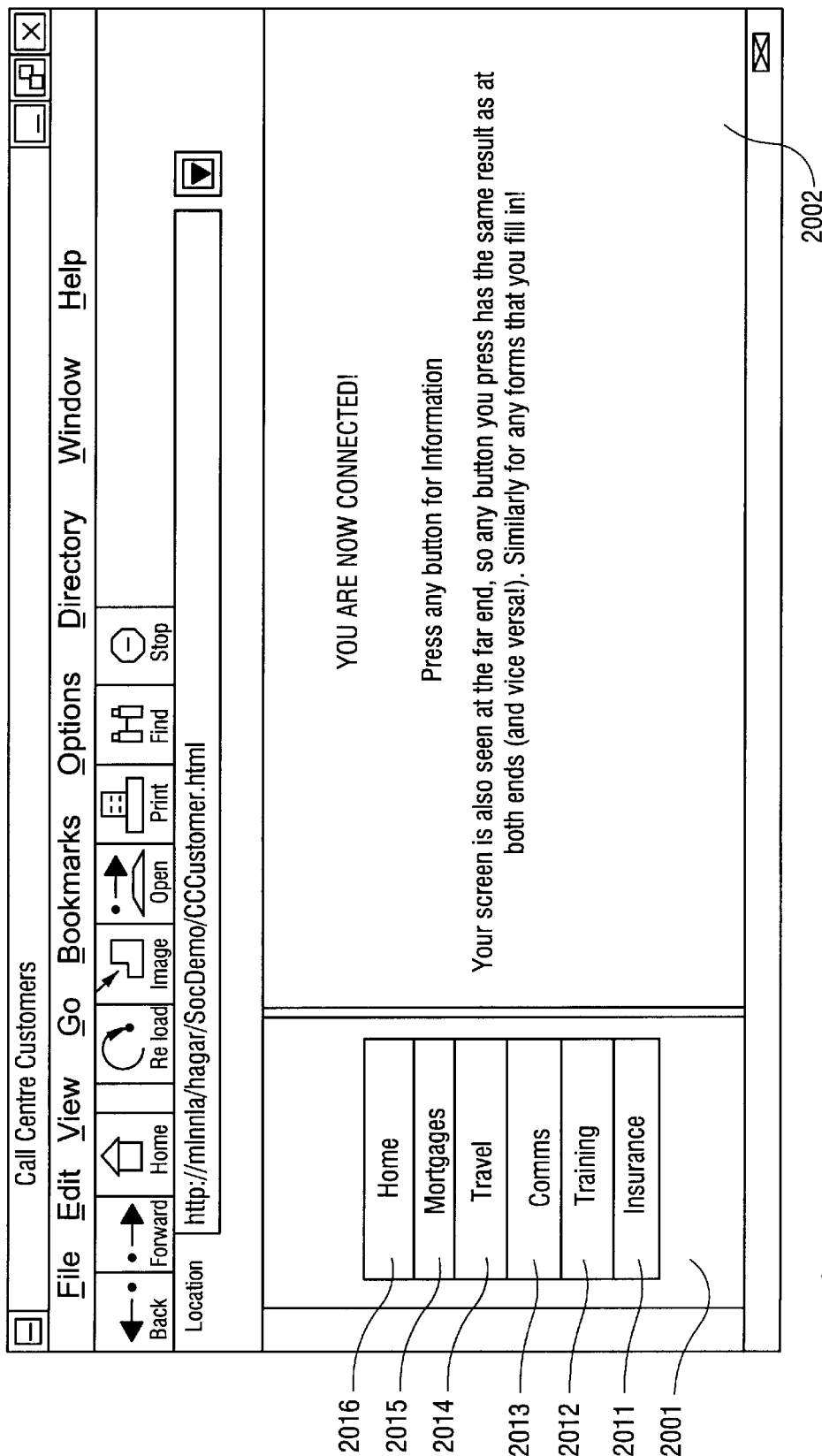

As shown in FIG. 11, frame 2002 displays a new message to the effect that connection has been established. Frame 2001 now displays a plurality of soft buttons which allow particular product types to be identified so that appropriate application forms may be completed with the agent's help. Thus, in the example shown, a first button 2011 relates to insurance services, a second button 2012 relates to training, a third button 2013 relates to communication, a fourth button 2014 relates to travel, and a fifth button 2015 relates to mortgages. In addition, a sixth button 2016 may be selected which takes the user back to the previous display, as shown in FIG. 10.

Figure 12:
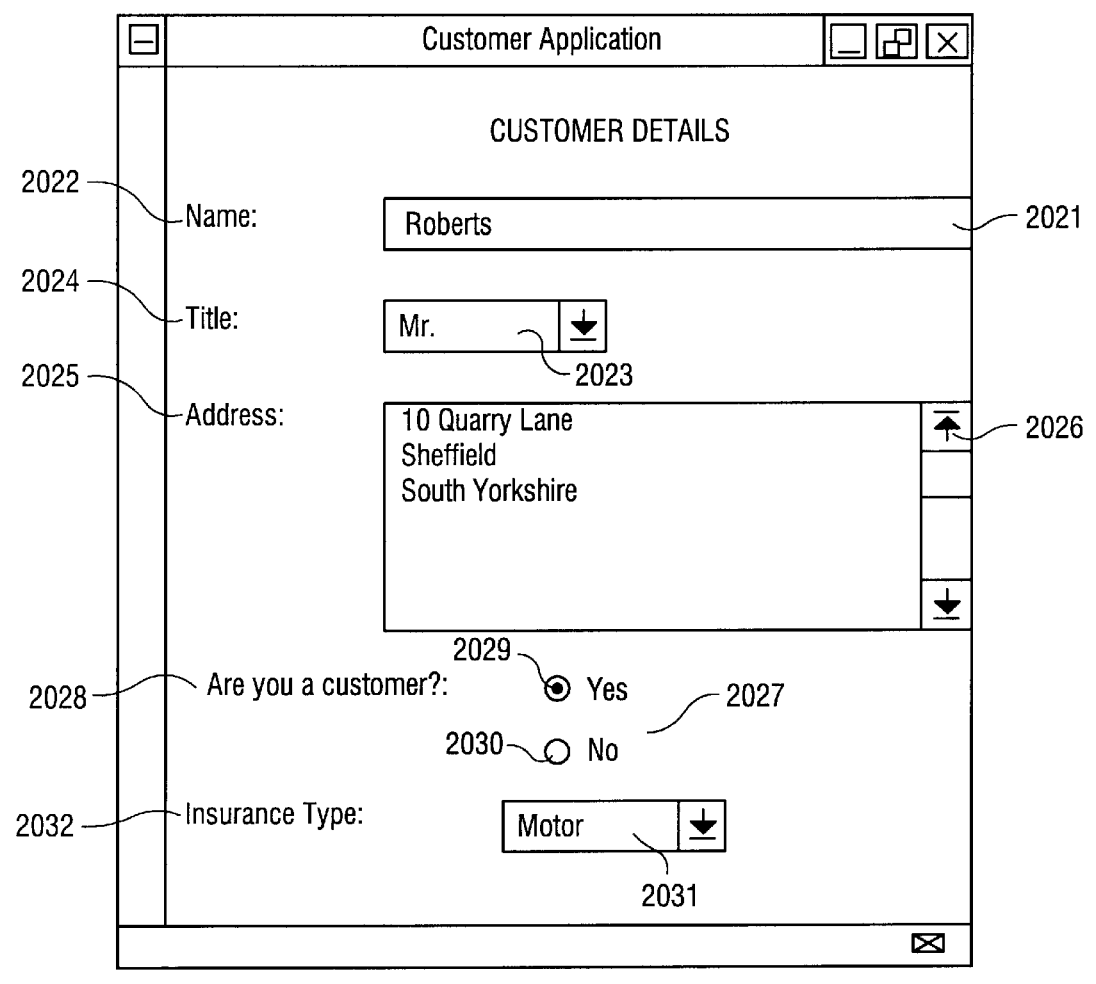

In this example, the user selects soft button 2011 because the user is interested in obtaining insurance. This activation is detected by the Java applet being executed upon the user's station, resulting in a new form being popped by the applet as shown in FIG. 12. Similarly, this information is also transmitted as a message to the server which in turn transmits similar information to the agent station such that its respective applet performs a similar operation resulting in a similar form being popped.

The new form, as shown in FIG. 12, consists of five data fields of different types, effectively prompting the customer to enter information. A first field 2021 is a text box in which the customer is prompted to enter their name. It has an associated field name 2022 which includes the text "name".

A second field 2023 takes the form of a pull-down into which text may be entered, similar to text field 2021 or, alternatively, particular entries may be selected from those available from the pull-down selection. This field has a similar field name 2024 with the text "title".

A similar field name 2025 is included for the address with the text "address". The address takes the form of a text area and has scroll bars 2026.

Customer field 2027 is identified by a field label 2028 and consists of a first selection button (or radio button) 2029 and a second similar button 2030. A caller may be a customer or may not be a customer, no other possibilities are available, therefore if one of these selections is enabled the second becomes automatically disabled. Thus, the caller identifies himself as a customer or not a customer. This field may be modified whether the customer is an existing customer or a casual browser etc.

Finally, field 2031 is a pull-down field identified by field name 2032 which in this example includes the text "insurance type". Thus, the user may enter text in this field or pull-down to make a selection from the preprogrammed entries. Thus, the calling customer may identify an interest in motor insurance.

After activating "call me" button 2003, branch exchange 207 will have initiated a voice telephone call back to the calling customer such that the customer and the agent may also communicate in this way. Thus, as a customer enters information in the field, questions may be asked and the agent may provide assistance. Similarly, a calling customer could have difficulty operating a keyboard, in which case the agent could type information in response to verbal information provided by the customer. The agent is also available to provide further information and clarification, so as to assist the customer completing the form, to ensure that the information is accurate and to significantly reduce the risk of the customer terminating the connection.

Each time information is entered by either the customer or the agent, this information is immediately relayed to the other end such that the system provides an environment which appears to behave if customer and agent are completing the same form. However, as previously described, the agent and the customer may perceive slight differences, possibly identifying text which has been identified locally or has been received from the remote end. The soft buttons remain operative when the form is displayed so that either the agent or the customer may press a button to request a new HTML page for display in the right frame.

When the form shown in FIG. 12 has been completed, appropriate further action may be initiated by the customer or by the agent. This may result in the generation of URL2, as shown in FIG. 3 with the subsequent reception of a web page from service site 3.

What is claimed is:

1. A method of communicating between a user station and an agent station, said method comprising:
   (a) establishing communication from said user station to a serving means; at the serving means, in response to (a),
   (b) selecting an available agent station from a number of agent stations currently in communication with said serving means;
   (c) detecting at each of said user station and said selected agent station events respectively generated by said user and said agent and, for each detected event, transmitting respective data to the serving means representative of that detected event;
   (d) at the serving means, in response to the receipt of said data from one of said user station and said selected agent station, processing that data to change its display characteristics and
   (e) transmitting the processed data to the other of said user station and said selected agent station for display thereat, whereby characters corresponding to said processed data are displayed differently at said user station and at said selected agent station from characters entered directly at said user station and at said selected agent station.

2. A method as in claim 1, said characters corresponding to said processed data being displayed in a different color from said characters entered directly at said user station and at said selected agent station.

3. A method as in claim 1, said characters entered directly at said user station and at said selected agent station being text characters entered via keyboard.

4. A method of communicating between a user station and an agent station, said method comprising:
   (a) establishing communication from said user station to a serving means; at the serving means, in response to (a),
   (b1) selecting an available agent station from a number of agent stations currently in communication with said serving means,
   (b2) transmitting from the serving means to said user station data for a display of prompting information including a first set of selectable options each of said selectable options being representative of a respective page stored on a remote source, and (b3) transmitting from the serving means to said selected agent station data for display of prompting information including a second set of selectable options, said second set including said first set;

(c) receiving at one of said user station and said selected agent station data generated by a corresponding one of said user or said selected agent identifying a selected option;

(d) transmitting said data identifying the selected option from said one station to said serving means;

(e) in response to receipt at the serving means of said data identifying the selected option, converting that data to a corresponding uniform resource locator (URL);

(f) transmitting that URL from the serving means to both said user station and said selected agent station; and (g) at each of said user station and said selected agent station, supplying the received URL to a respective browser for requesting the respective page corresponding to that URL.

5. A method as in claim 4 wherein said user at said user station initiates communication to make contact with said serving means.

6. A method as in claim 5 wherein agents at said agent station identify their availability to receive communications from users by contacting said serving means.

7. A method as in claim 6 wherein a telephone call is established between said user and an agent in response to said communications being established between associated stations and said serving means.

8. A method as in claim 4 wherein said user and agent stations execute browsing instructions, transmit resource locations and receive encoded pages of information form said serving means.

9. A method as in claim 8 wherein encoded pages include executable routines to present modified pages at said stations.

10. A method as in claim 4 wherein data inputted by said user is encoded as a message and transmitted to said serving means.

11. A method as in claim 10 wherein said serving means transmits encoded pages to associated stations in response to receiving said messages.

12. A method as in claim 2, said characters entered directly at said user station and at said selected agent station being text characters entered via keyboard.

* * * * *